M. LICHTMAN.
PHOTOGRAPHIC CAMERA.
APPLICATION FILED MAY 13, 1915.
1,222,310.
Patented Apr. 10, 1917.
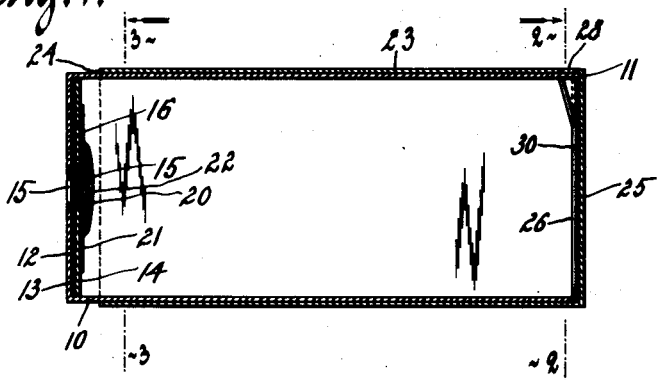
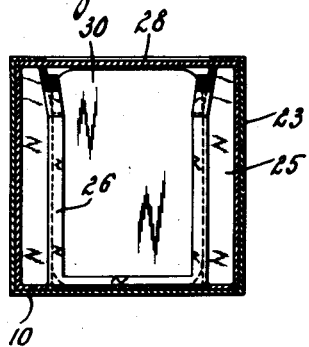
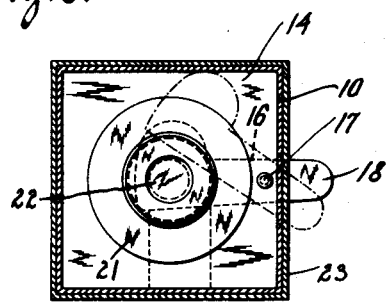
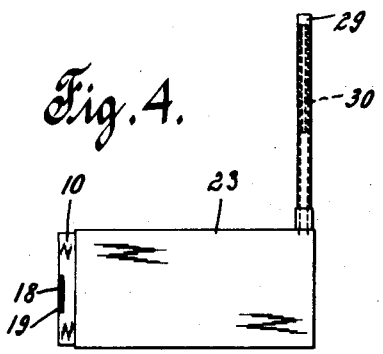
WITNESS
Ch. Rane.
INVENTOR
M. Lichtman
BY
Sigmund Herzog
his ATTORNEY

UNITED STATES PATENT OFFICE.

MICHAEL LICHTMAN, OF NEW YORK, N. Y.

PHOTOGRAPHIC CAMERA.

1,222,310.  Specification of Letters Patent.  Patented Apr. 10, 1917.

Application filed May 13, 1915. Serial No. 27,856.

*To all whom it may concern:*

Be it known that I, MICHAEL LICHTMAN, a citizen of the United States, and a resident of the city of New York, in the county of New York and State of New York, have invented certain new and useful Improvements in Photographic Cameras, of which the following is a specification.

The present invention relates to photographic cameras, and has for its main object to produce a device of this type which is simple in construction, efficient in operation, and which can be manufactured and sold at an extremely low cost. Another object of the invention is to produce a device of this type which can be loaded in daylight, and from which the exposed plates can be conveniently transferred into a developing and fixing tank without the use of the usual dark room.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawings, in which:—

Figure 1 is a longitudinal vertical section taken through a camera constructed in accordance with the present invention; Fig. 2 is a section taken on line 2—2 of Fig. 1; Fig. 3 is a section taken on line 3—3 of Fig. 1; and Fig. 4 is a side elevation of the camera on a smaller scale, showing the method of loading, that is to say the way of insertion of a sensitized photographic plate.

In the drawings the numeral 10 indicates one section of the camera casing, said section being made in the form of a box-shaped body, that is open at its rear 11, and provided with a front end 12, comprising an outer flap 13 and an inner flap 14. In the flaps 13 and 14 are provided registering exposure openings 15, controlled by a shutter 16, which is located between the said two flaps and is pivoted at 17 thereto. The shutter comprises a substantially L-shaped metallic plate, its end 18 projecting through an opening 19 in one of the sides of the casing section 10, the projecting portion of said shutter serving as a handle, by means of which the shutter is actuated. In rear of the exposure opening in the flap 14 is disposed a lens 20, held upon the said flap by a gummed piece of paper 21, or similar means, having an aperture 22 in registering position with the exposure openings in the said two flaps.

The other section of the camera casing is denoted by the numeral 23, this last named section being also made in the form of a box-shaped body, that is open at its front 24, and closed at its rear by an end 25. To the inner face of the rear end 25 is attached in any suitable manner a plate rack 26, comprising a substantially U-shaped strip, that is suitably spaced from the inner face of the rear end 25, its upper end being flared and in alinement with a transverse slot 28 in the top of the casing section 23. The section 10 of the camera casing is slidably disposed in the section 23 thereof. When the section 10 is in its innermost position, in which its rear 11 abuts against the inner face of the rear end 25 of the section 23, the slot 28 is closed by the top of the section 10.

The sensitized photographic plates are stored each in a plate holder 29, consisting of a bag-like shell, the mouth of which may be closed by bending its top portions back upon one of the faces of the body section thereof, and holding them thereon by a gummed strip or similar means.

In order to insert a plate into the camera, the casing portion 10 is drawn out of the casing portion 23 until the slot 28 in the top of the latter is uncovered. The plate holder is then opened and its mouth brought into alinement with the said slot (Fig. 4), in which position the plate 30 therein will slide onto the rack 26, and be thus held in proper position in relation to the lens of the camera. The casing section 10 is then telescoped into the section 23 until its open rear end abuts against the inner face of the end 25 of the end section 23. The plate holder is then removed, and the picture taken in the usual manner.

The pictures taken on the plate may be developed and fixed in broad daylight by the aid of a specially constructed developing and fixing tank (not shown). The camera is placed in its upside-down position onto this tank in a manner that its slot 28 registers with the said tank. The section 10 of the casing is then drawn out a little distance from the section 23 thereof, whereby the plate slides through the slot 28 into the tank, in which it is developed and fixed.

The two telescoping sections of the casing are, as appears from the foregoing, adapted to be disengaged, at will, from each other. When the developing and fixing tank 31, and the plate carrier 34 are not in use, they are placed, together with the plate holder 29, into the casing section 10, which is then telescoped into the section 23 of the casing. In this manner the casing serves as a storage receptacle, preventing thereby misplacing of parts of the outfit.

What I claim is:—

A photographic camera comprising a casing made of two telescoping sections adapted to be disengaged, at will, from each other, the inner section being provided in its front end with an exposure opening, a lens in operative relation to said opening, a shutter coöperating with said lens, the outer casing section having a transverse slot in its top portion near its rear end, and a plate rack upon the inner face of the rear end of said outer section in alinement with said slot, the top portion of said inner section closing normally the transverse slot in said outer section.

Signed at New York, in the county of New York, and State of New York, this 29th day of April, A. D. 1915.

MICHAEL LICHTMAN.